Patented Nov. 4, 1924.

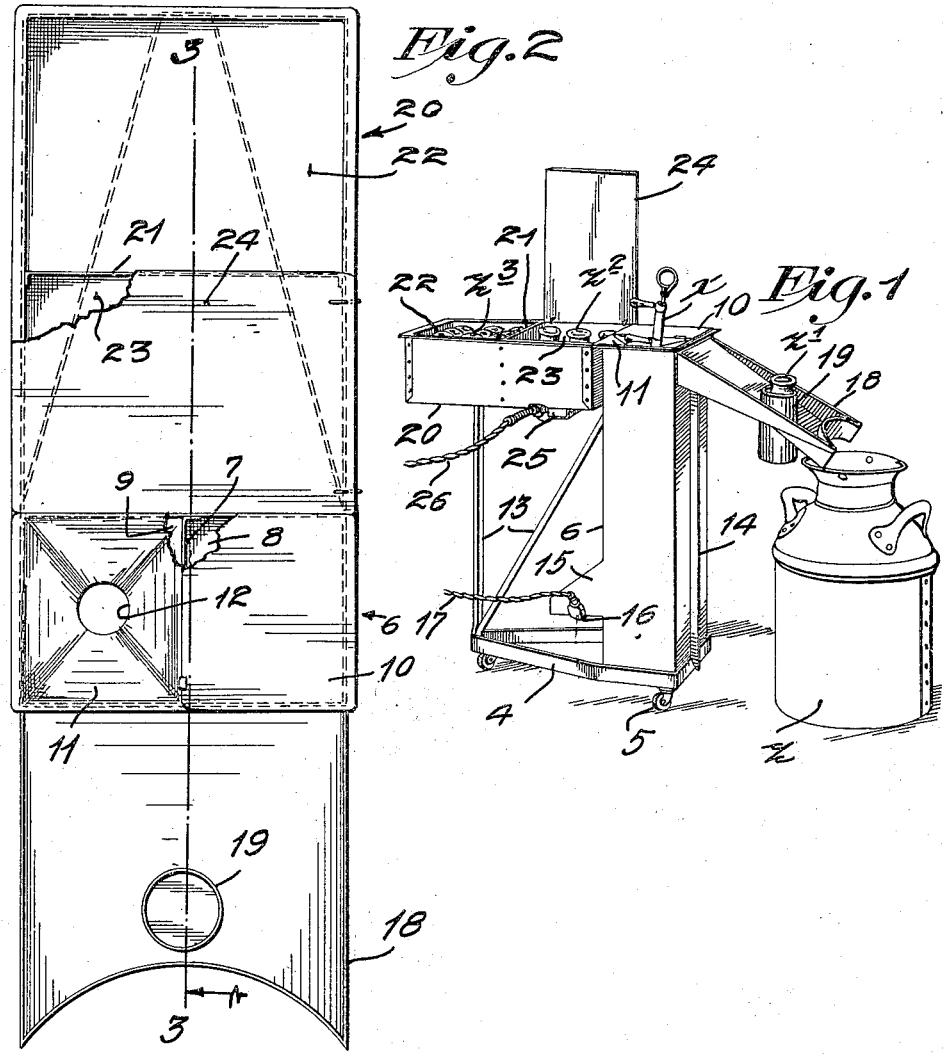

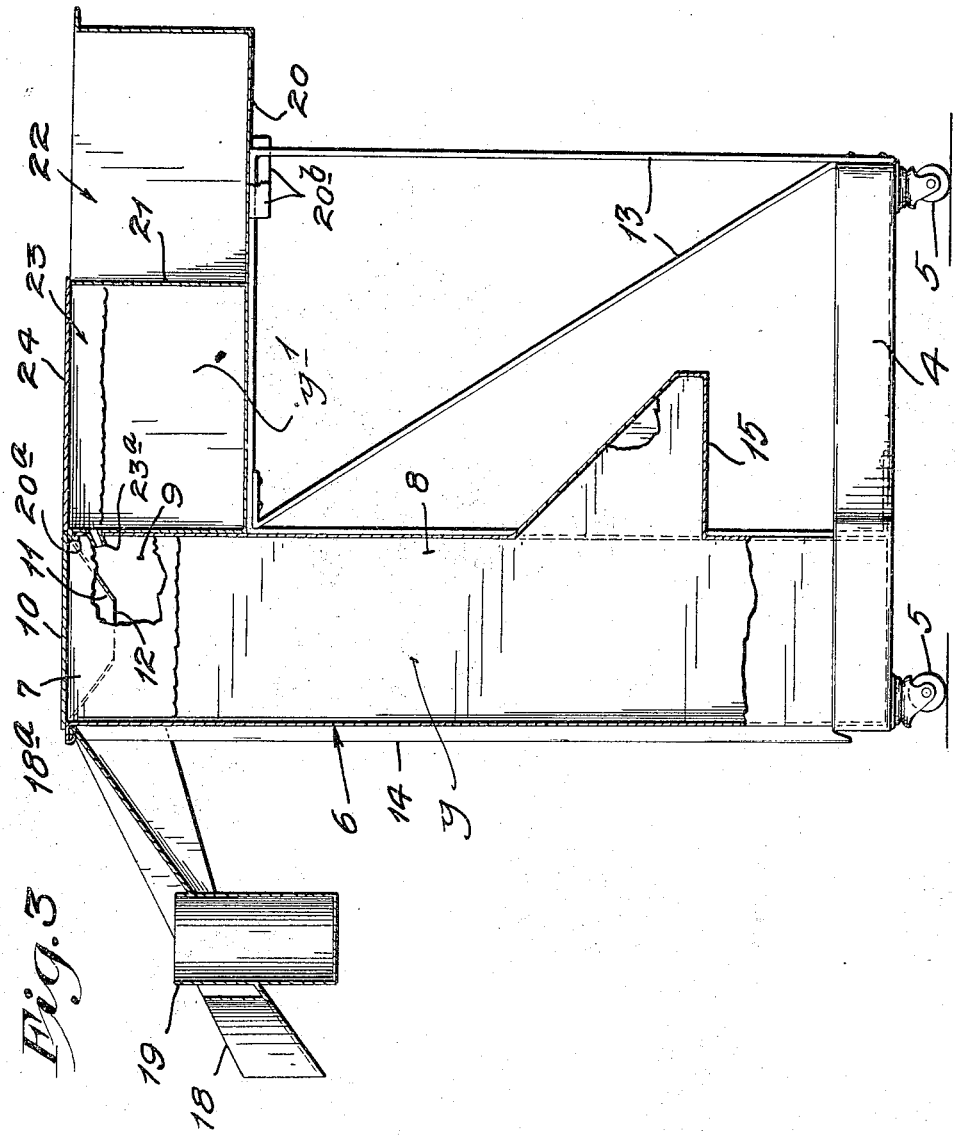

1,514,282

UNITED STATES PATENT OFFICE.

ORA E. HARRIS, OF KEARNEY, NEBRASKA.

MILK AND CREAM SAMPLING EQUIPMENT CABINET.

Application filed May 9, 1923. Serial No. 637,737.

*To all whom it may concern:*

Be it known that I, ORA E. HARRIS, a citizen of the United States, residing at Kearney, in the county of Buffalo and State of Nebraska, have invented certain new and useful Improvements in Milk and Cream Sampling Equipment Cabinets; and I do hereby declare the following to be a full, clear, and exact description of the invention, such as will enable others skilled in the art to which it appertains to make and use the same.

My invention has for its object to provide a portable cream and milk sampling equipment cabinet for use in creameries, cheese factories and cream and milk buying or receiving stations where these food commodities are to be accurately sampled for the purpose of testing for the percentage of butter fat contained therein.

As is well known, cream and milk are delivered to receiving stations in cans, and which cans are usually arranged in a row on the floor of the receiving room. From each of these cans a sample is taken which, in the present day method, requires considerable walking and exertion, for the reason that the sampler makes a trip to each can for procuring a sample therefrom.

By the use of my invention, the portable cabinet may be moved from one can to the other and a sample taken from each thereof, thus saving considerable time and labor and assuring more dependable accuracy in sampling cream or milk.

The invention also provides better sanitation for cream and milk sampling equipment by keeping the same unexposed to flies and dust, and also affords an automatic washer for the sampling equipment which is held in the most convenient positions possible with the view of being easily accessible to the operator.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the invention, positioned at one side of a cream or milk can from which a sample may be taken;

Fig. 2 is a plan view of the same; and

Fig. 3 is a view principally in longitudinal vertical section taken on the line 3—3 of Fig. 2.

The numeral 4 indicates a platform having an upstanding marginal flange, and which platform, as shown, has an outline which is substantially in the form of an isosceles triangle, and for the purpose of this case, the base of said triangle will hereinafter be referred to as the front of the cabinet, for the sake of convenience. Said platform 4 is supported on three casters 5 located at the corners thereof, and this arrangement of said casters makes it very easy to turn or guide the portable cabinet while moving the same.

Mounted on the platform 4, at the front thereof, is a removable water vat 6 having a central partition 7 which extends from the front to the rear thereof and divides the vat into two compartments 8 and 9, the former of which is especially adapted to hold a stirring rod, not shown, and the latter of which is especially adapted for holding a suitable sampling instrument $x$. The compartments 8 and 9 are normally closed by displaceable covers 10 and 11, respectively, hinged over the partition 7 for opening movement toward and from each other, and the latter of said covers is depressed and provided with a central opening 12 for holding the sampling instrument $x$ as shown in Fig. 1, The purpose of depressing the cover 11 is to drain water, cream or milk dripping from the sampling instrument $x$ back into the compartment 9. It will be noted that the sampling instrument $x$ projects through and above the opening 12 and is held by said cover in a very accessible and convenient position for the operator.

At the back of the water vat 6 is a rearwardly extended skeleton frame 13 secured to the platform 4. This frame 13 and the flange on the platform 4 hold the vat 6 against horizontal movement on said platform but with freedom for removal therefrom.

To efficiently heat the water $y$ in the two compartments 8 and 9, and thereby keep the instruments held therein in a sanitary condition, the water vat 6 is provided with a rear extension 15 under which is applied an electric heater 16. This extension opens into the two compartments 8 and 9, and the partition 7 extends therethrough to keep said two compartments separate. An extension cord 17, leading from a lamp socket or any other suitable source of electrical energy, is attached to the heater 16.

Attached to the top portion of the water vat 6, at the front thereof, is a downwardly and forwardly inclined drip tray 18, the front of which is made concave to permit said drip tray to be positioned over the neck of a cream or milk can $z$, as shown in Fig. 1, and thereby permits a sample to be taken from the can without dripping cream or milk on the floor. A cylindrical holder 19 for a sample bottle $z^1$ is secured to the central portion of the bottom of the drip tray 18 and extends through the bottom thereof, as shown in Figs. 1 and 2. The drip tray 18 is detachably secured to the water vat 6 by interlocking flanges $18^a$ on the upper edges of said tray and vat.

A box-like member 20 is removably supported on the top of the frame 13 with its upper edge in substantially the same plane as the upper edge of the water vat 6 and is attached thereto. This box-like member 20 is held in position on the frame 13 by a hook-like flange $20^a$ which engages the upper edge portion of the water vat 6 and by a pair of depending flanges $20^b$ on the bottom of said member, and between which the top member of the frame 13 extends. A transverse partition 21, in the box-like member 20, separates the same into a rear empty sample bottle compartment 22 and a front sample bottle bath compartment 23, the latter of which is provided with a displaceable cover 24 to exclude flies and dust. The water $y^1$ in the bath compartment 23 is heated by means of an electric heater 25 applied to the bottom of the member 20 directly under the compartment 23, and which heater is provided with an extension cord 26 attachable in the same manner as the extension cord 17. By heating the water in the bath compartment 23, the cream and milk in sample bottles $z^2$ may be kept at the proper temperature as required by dairy laws and rulings. The empty bottles in the compartment 22 are indicated by the character $z^3$. It is, of course, understood that in place of heating the compartments 8, 9 and 23, by means of electricity, the same may be heated by oil, gas or other suitable means.

As previously stated, a sample of cream or milk may be taken from the can $z$ by the instrument $x$ and deposited in the sample bottle $z^1$ without dripping any of the cream or milk on the floor, for the reason that the drip tray is arranged to be supported over a can, as shown in Fig. 1. After a sample of the cream or milk is deposited in one of the cream or milk bottles, the bottles are sealed and properly marked, and then placed in the bath compartment 23 where they are kept at the proper temperature and in a sanitary condition.

In actual usage, a wire basket, similar to the ones used by milk men in carrying bottles of cream or milk, will be placed in the bath compartment 23 to receive the sample bottles $z^2$ and to permit the same to be all removed from said compartment at the same time.

The above described invention has, in actual usage, proven highly efficient for the purpose had in view. As shown, the entire cabinet is made from metal, and is easy to keep clean and in a sanitary condition for the reason that the water vat 6, drip tray 18 and box-like member 20 can all be separated, the one from the other, and removed from the platform 4 and frame 13.

The bottle bath compartment 23 is provided with an overflow pipe $23^a$ arranged to discharge into the water vat compartment 8, and the purpose of this overflow pipe is to carry off the water in the bottle bath compartment 23 as the same rises therein due to displacement by the placing of additional sample bottles in said compartment 23.

In actual construction, handles, not shown, will be attached to the upper portions of the water vat 6 and box-like member 20 for the convenience of moving the cabinet from one position to another or for removing the said vat and member from the platform and frame for the purpose of cleaning the same.

What I claim is:

1. A cabinet of the kind described comprising a two-compartment water vat, a depressed cover, having a central opening, for one of the compartments, and a drip tray having a bottle holder.

2. A cabinet of the kind described comprising a two-compartment water vat, a displaceable cover for each of the compartments, one of said covers being depressed and provided with a central opening, and a drip tray having a bottle holder.

3. A cabinet of the kind described comprising a water vat, an inclined drip tray provided with a concave lower end and arranged to be positioned over a cream or milk pan.

4. A cabinet of the kind described comprising a water vat and means for heating the same, a drip tray having a bottle holder, a bottle bath compartment and means for heating the same, and an empty bottle compartment.

5. The structure defined in claim 4 in which the water vat is divided into two compartments, and a cover for one of the water vat compartments, said cover being depressed and provided with a central opening.

6. The combination with a traveling platform, a water vat mounted on said platform, an inclined drip tray extending outward of the water vat and adapted to be positioned over a receptacle, and a bottle holder on the drip tray.

In testimony whereof I affix my signature.

ORA E. HARRIS.